(12) United States Patent
Buck et al.

(10) Patent No.: US 9,495,497 B1
(45) Date of Patent: Nov. 15, 2016

(54) DYNAMIC VOLTAGE FREQUENCY SCALING

(71) Applicant: International Business Machines Corporation, Armonk, NY (US)

(72) Inventors: Nathan C. Buck, Underhill, VT (US); Eric A. Foreman, Fairfax, VT (US); Jeffrey G. Hemmett, St. George, VT (US); Kerim Kalafala, Rhinebeck, NY (US); Gregory M. Schaeffer, Poughkeepsie, NY (US); Stephen G. Shuma, Underhill, VT (US); Natesan Venkateswaran, Hopewell Junction, NY (US); Chandramouli Visweswariah, Croton-on-Hudson, NY (US); Michael H. Wood, Hopewell Junction, NY (US); Vladimir Zolotov, Putnam Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/960,601

(22) Filed: Dec. 7, 2015

(51) Int. Cl.
*G06F 17/50* (2006.01)

(52) U.S. Cl.
CPC ....... *G06F 17/5045* (2013.01); *G06F 17/5081* (2013.01)

(58) Field of Classification Search
CPC .... G06F 1/10; G06F 1/3296; G06F 17/5031; G06F 2217/84; G06F 2217/78; Y02B 60/1217; Y02B 60/1285
USPC .......................................... 716/108, 113, 134
See application file for complete search history.

(56) References Cited

U.S. PATENT DOCUMENTS

| | | | |
|---|---|---|---|
| 8,180,621 B2* | 5/2012 | Phillips | G06F 17/5031 703/14 |
| 2009/0049314 A1 | 2/2009 | Taha et al. | |
| 2012/0235716 A1 | 9/2012 | Dubost et al. | |
| 2013/0002331 A1 | 1/2013 | Horikoshi et al. | |
| 2013/0141138 A1 | 6/2013 | Vo et al. | |
| 2013/0145333 A1* | 6/2013 | Buck | G06F 17/505 716/113 |
| 2014/0210510 A1* | 7/2014 | Chromczak | G06F 1/10 326/33 |

FOREIGN PATENT DOCUMENTS

| | | |
|---|---|---|
| EP | 2762991 A1 | 8/2014 |
| GB | 2404055 A | 1/2005 |
| WO | 2013093362 A1 | 6/2013 |

OTHER PUBLICATIONS

Lee et al., "A variable frequency link for a power-aware network-on-chip (NoC)", Integration, the VLSI journal, vol. 42, 2009, pp. 1-8.

* cited by examiner

*Primary Examiner* — Nghia Doan
(74) *Attorney, Agent, or Firm* — Cantor Colburn LLP; Jennifer Anda

(57) ABSTRACT

A method, system, and computer program product to perform dynamic voltage frequency scaling of an integrated circuit include performing statistical timing analysis using a canonical form of a clock, the canonical form of the clock being a function of variability in voltage. Obtaining a canonical model expressing timing slack at each test location of the integrated circuit is as a function of one or more sources of variability, one of the one or more sources of variability being voltage, and performing the dynamic voltage-frequency scaling based on selecting at least one of a clock period and the voltage using the canonical model.

20 Claims, 5 Drawing Sheets

DYNAMIC VOLTAGE FREQUENCY SCALING

BACKGROUND

The present invention relates to integrated circuit design, and more specifically, to dynamic voltage frequency scaling.

Integrated circuits or chips are increasingly used in a number of applications such as consumer electronics, computing devices, and communication systems. While higher speed operation of chips is desirable, the increased speed (chip frequency) comes at the cost of higher power consumption. To balance performance and power usage, integrated circuits may include adaptive voltage regulators that facilitate changing the voltage during operation of the chip to achieve a certain operational frequency. Thus, for example, voltage may be increased when higher performance is needed and voltage may be decreased when low power consumption is desired. In order to adjust the voltage as needed, the relationship between voltage and frequency must be understood.

SUMMARY

Embodiments include a method, system, and computer program product to perform dynamic voltage frequency scaling of an integrated circuit. Aspects include performing statistical timing analysis using a canonical form of a clock, the canonical form of the clock being a function of variability in voltage; obtaining a canonical model expressing timing slack at each test location of the integrated circuit as a function of one or more sources of variability, one of the one or more sources of variability being voltage; and performing the dynamic voltage-frequency scaling based on selecting at least one of a clock period and the voltage using the canonical model.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, an integrated circuit may operate at different voltage-frequency points based on controlling an adaptive voltage regulator of the chip. The dynamic voltage-frequency scaling (DVFS) requires determining the voltage-frequency relationship of the chip. One prior approach has involved selecting optimal voltage and frequency values during manufacturing. For a given chip, a specified frequency is ensured to be reached at a specified voltage, but this approach may affect the yield. Another approach has determined voltage and corresponding frequency pairings during design for a number of timing corners (chip and environmental conditions), but this approach is costly in terms of resource usage and turn-around time (TAT). Embodiments of the systems and methods detailed herein relate to determining voltage-frequency pairings during design using a canonical clock assertion/timing constraint. The inefficiency of asserting a standard clock for multiple timing corners is addressed by determining the clock period as a function of variability, as further discussed below.

Static timing analysis (STA) and statistical static timing analysis (SSTA) are known in chip design timing verification and are briefly described here to introduce the concept of canonical expressions according to embodiments. Timing analysis involves the propagation of arrival time at the input of a computational thread through the intervening components to an output. At each node, the arrival time is determined as the sum of the arrival time at the previous node and the delay through the edge (e.g., wire) connecting the two nodes. Arrival time is, therefore, propagated forward from the input node to the output node(s) of interest. A setup test, which is a specific timing analysis test, is discussed herein for explanatory purposes, but any frequency-dependent timing analysis test may be used according to the embodiments. In order to efficiently consider multiple corners, canonical expressions are used according to the embodiments detailed below. A canonical form is a known way to express the relationship between two or more variables and allows a parameter to be considered as a function of its variability. All gate and wire delays, arrival times, slacks, and slews (rise and fall times) may be expressed in canonical first-order form as:

$$a_0 + \sum_{i=1}^{n} a_i \Delta X_i + a_{n+1} \Delta R_a \qquad [\text{EQ. 1}]$$

In EQ. 1, a0 is the mean or nominal value, $\Delta X_i$ (for i=1 to n) represents the variation of up to n sources of variation $X_i$, with corresponding nominal values $a_i$, $\Delta R_a$ is the variation of an independent random variable $R_a$ from its mean value, and $a_{n+1}$ is the sensitivity of the timing quantity to $R_a$.

Figure 1:
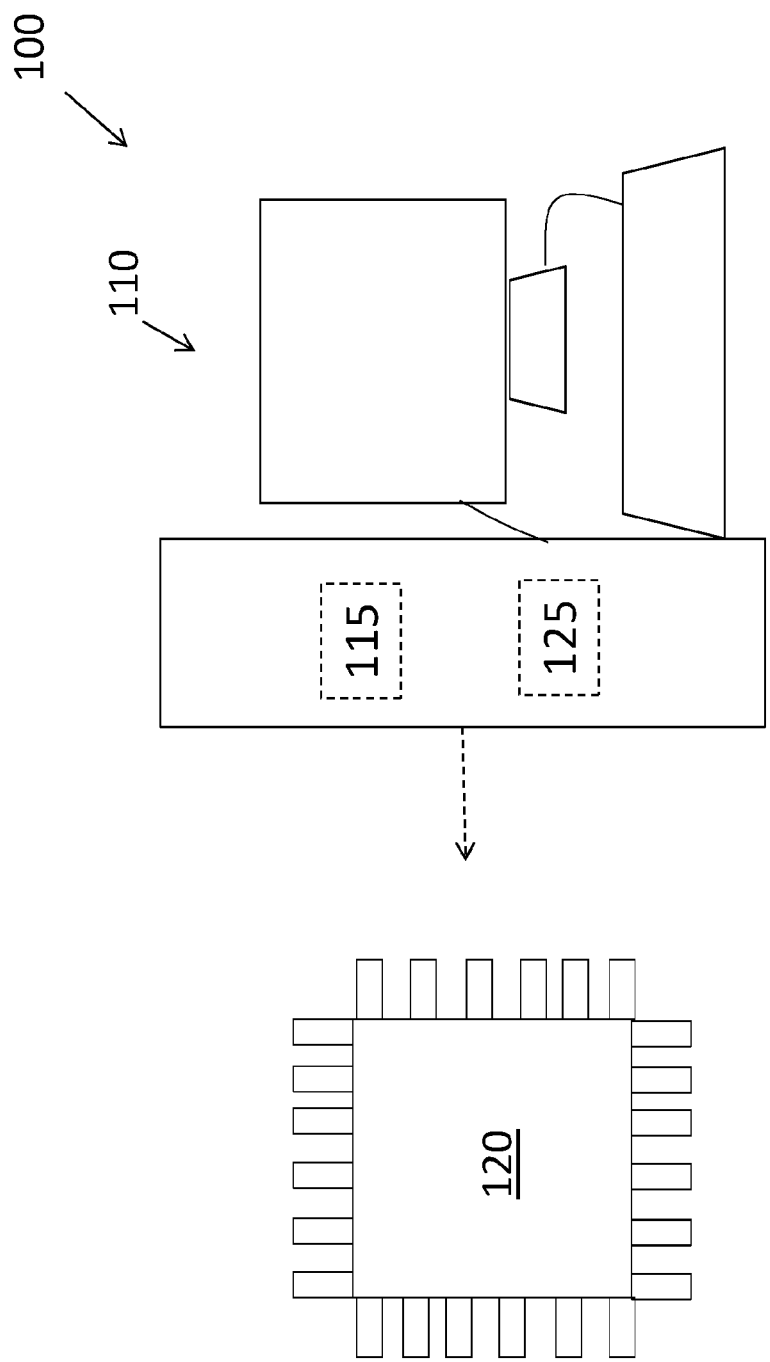
FIG. 1 is a block diagram of a system according to embodiments.

FIG. 1 is a block diagram of a system 100 according to embodiments of the invention. The system 100 includes a processing system 110 used to design an integrated circuit and the resulting physical implementation of the integrated circuit 120. The system 100 includes additional known components that perform functions such as, for example, obtaining measurements from the integrated circuit 120 that are provided to the processing system 110 as needed. The processing system 110 includes one or more memory devices 115 and one or more processors 125. Multiple of the processors 125 may be used in the determination of the voltage-frequency pairings detailed below. The memory device 115 stores instructions implemented by the processor 125. As further discussed below, these instructions include processes used to perform the determination of the voltage-frequency pairings. According to the embodiments detailed below, the memory device 115 may additionally store the information generated from the models discussed below.

Figure 2:
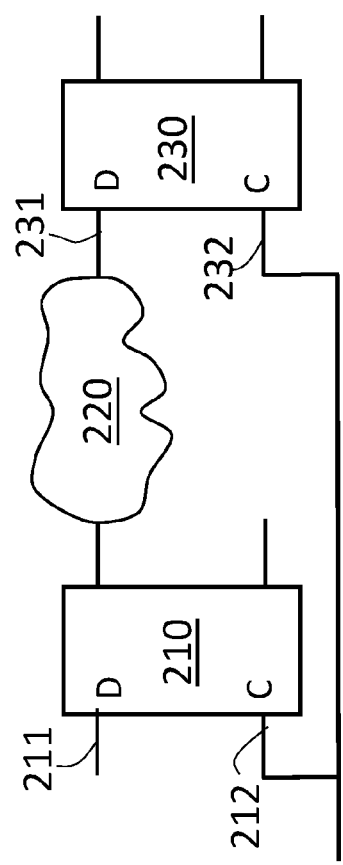
FIG. 2 shows exemplary components of a chip design that are analyzed with a canonical clock according to embodiments.

FIG. 2 shows exemplary components of a chip design that are analyzed with a canonical clock according to embodiments. Timing analysis is the process of determining if all aspects of the chip design meet timing requirements prior to physical implementation of the design. Several tests may be conducted as part of timing analysis (e.g., setup test, hold test) but the setup test is of relevance according to the embodiments herein. This is because the setup test facilitates determining the clock period (which is the inverse of the clock frequency). The setup test ensures that the latest possible arrival time at the input of a data node of a latch is earlier than the earliest possible arrival time at the input of a clock node of the same latch. When the setup test is passed, the data is acquired correctly at the latch. One setup test with respect to one latch (flip flop 230) is detailed below for explanatory purposes, but the setup test is performed for every latch of the chip as further discussed below. As noted above, although the setup test is discussed for explanatory purposes, any timing test that is frequency dependent (on clock) would be relevant to the timing analysis pertaining to embodiments of the invention.

FIG. 2 shows a flip-flop 210 with a data input 211 and a clock input 212. Additional data logic 220 may include an inverter, buffer, or other component(s). This leads to a second flip-flop 230 with its data input 231 and clock input 232. According to the setup test, the arrival time of a signal at the data input 231 and at the clock input 232 are compared. The arrival time is generally the time at which the signal reaches half of its full value during transition, but that time may vary based on environmental conditions (e.g., temperature) or chip conditions (e.g., battery level). Each set of conditions or variables is referred to as a corner. Thus, the arrival time may be expressed as {early mode, late mode} arrival time to account for the earliest and latest arrival times based on various corners. As part of the timing analysis to verify the chip design, a setup test may be performed to determine if the late mode arrival time at the data input 231 is earlier than the early mode arrival time at the clock input 232, for example. When this is not the case, the data may not be captured correctly at the flip-flop 230. If the late mode arrival time at the data input 231 is earlier than the early mode arrival time at the clock input 232 by some amount of time, that amount of time is referred to as positive slack S. A guard time $T_G$ (or setup margin) may be required by the test, as well, such that the late mode arrival time at the data input 231 must be earlier than the early mode arrival time at the clock input 232 by a duration equal to $T_G$. However, determining the early mode arrival time and the late mode arrival time requires considering all the corners. As detailed below, embodiments of the invention instead facilitate determining the parameters of interest as a function of variability.

Figure 3:
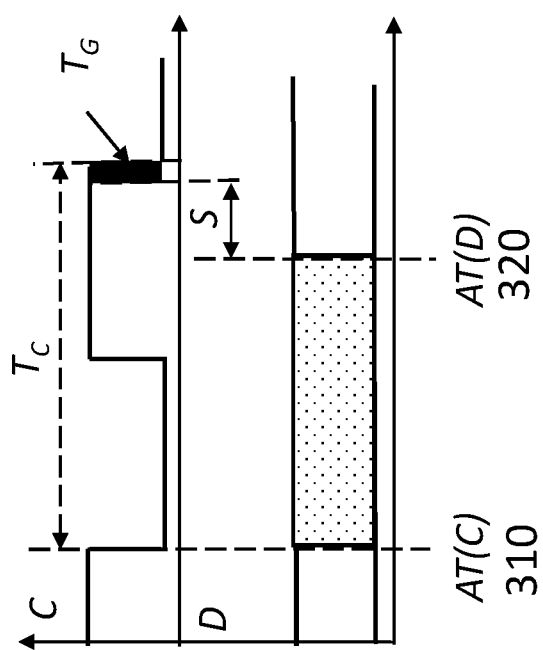
FIG. 3 shows exemplary clock cycles for the data and clock nodes shown in FIG. 2.

FIG. 3 shows exemplary clock cycles for the data 231 and clock 232 nodes shown in FIG. 2. A single corner is considered first for explanatory purposes. The clock period $T_C$ and the arrival time at the clock input 232 AT(C) 310 are shown. The arrival time at the data input 231 AT(D) 320 is also shown. With the guard time $T_G$ as indicated, the slack S may be determined as:

$$S = AT(C) + T_C - AT(D) - T_G \quad [\text{EQ. 2}]$$

Solving EQ. 2 for the clock period gives:

$$T_C = AT(D) - AT(C) + T_G + S \quad [\text{EQ. 3}]$$

In order for the timing test to be satisfied, the slack S must be greater than or equal to zero. Thus, 0 is the minimum slack value required for the timing test to pass. If the slack S=0 (i.e., the test is passed by a minimum margin), then:

$$T_C = AT(D) - AT(C) + T_G \quad [\text{EQ. 4}]$$

To be clear, the clock period is the reciprocal of the frequency (frequency=1/clock period). Thus, for a given corner that considers a given voltage value, EQ. 4 may be used to determine the frequency. As noted above, a prior approach has been to then change the corner (including the voltage) and re-compute EQ. 4 repeatedly, thereby obtaining the clock frequency at multiple corners. As also noted above, this approach is inefficient in both resource usage and turn-around time.

According to embodiments of the invention, the clock period $T_C$ is expressed in canonical form to consider variabilities such that inefficient processing of multiple corners is avoided. As noted above, a canonical form is a known way to express the relationship between two or more variables and allows a parameter to be considered as a function of its variability. In the current embodiments, one of the sources of variation is voltage. Other sources of variation include process variation. Process variation refers to variability that may occur during the manufacturing process. For example, when wires of the integrated circuit are printed, there may be variability in the thickness of the wires. Other such manufacturing process-related variabilities are also considered, as well as on-chip variation or cross-chip variation, for example. Random variation may also be considered. In EQ. 4, each of the variables, AT(D), AT(C), and $T_G$, may be expressed in canonical form in order to obtain $T_C$ in canonical form.

As a further explanation of canonical form, an example is provided of a canonical model of delay of a circuit (DEL), which could pertain to the accumulation of delays forming the arrival time at the data input (AT(D)) or the arrival time at the clock input (AT(C), for example. DEL can be represented as a (sum) of the mean value, process sensitivity, and voltage sensitivity in the example, although other sources of variability may be considered (added), as well. That is, the exemplary DEL is given by:

$$DEL = \text{mean} + \text{voltage\_sensitivity} + \text{process\_sensitivity} \quad [\text{EQ. 5}]$$

The exemplary mean value is 50 picoseconds (psec), the process sensitivity is 10 psec/sigma, and the voltage sensitivity is 5 psec/sigma. Sigma is an indication of the amount deviation from the mean. For example, the voltage sensitivity indicates how sensitive the DEL is to voltage variability, and this sensitivity may be expressed as psec per millivolts (mV) of deviation from a predefined sigma from the mean voltage value. Given the DEL as a function of variability, the DEL for a specific corner may be projected. The variability values over a range of conditions may be available as a sensitivity look-up table in a delay model, for example. Alternately, variability may be computed as the difference of two delays at two different voltage points where again the delays are retrieved from two different delay models. This technique is known as finite-differencing. In the present example, if the process corner of high voltage (+3 sigma) and slow process (−3 sigma) is desired, then the components of the canonical model in EQ. 5 can be determined and DEL can be projected as:

$$DEL = 50 + 3(5) - 3(10) = 35 \text{ p sec} \quad [\text{EQ. 6}]$$

As the example above indicates, a canonical expression of DEL facilitates a projection of DEL for different voltage values (deviations from a normal value).

When each parameter in EQ. 4 (AT(D), AT(C)) is expressed in canonical form, the clock cycle (clock period $T_C$), in canonical form, may be written as:

$$T_C = t_0 + \sum_{i=1}^{n} a_i \Delta X_i + r \Delta R \quad [\text{EQ. 7}]$$

In EQ. 7, t0 is the mean value, $a_i \Delta X_i$ refers to each of the n sources of variabilities (e.g., voltage, process), and $r\Delta R$ is the random variation. Any clock period T such that $T > T_C$ would satisfy the timing test. By way of summary, the clock period $T_C$ was derived assuming a minimum slack (S=0) for a setup timing analysis test (EQ. 4). The components of EQ. 4 are expressed in canonical form to derive the canonical form of the clock period $T_C$ in EQ. 7. The variability in voltage and other sources (e.g., temperature, process (e.g., wire thickness)) is considered with respect to each of the components of $T_C$ (AT(D), AT(C)). These variability sources exist irrespective of whether a nominal or canonical clock is asserted. The clock is the timing engine needed for propagation of arrival time and delay in timing analysis and the clock assertion refers to the constraint on that timing. When a canonical clock is asserted according to embodiments of the invention (the clock is expressed as a function of variabilities), dependence of the clock on variability in the voltage, for example, may additionally be considered, as further discussed below.

Expressing each arrival time and delay in canonical form (e.g., as shown for an exemplary delay in EQ. 5) allows asserting a canonical clock (a vector accounting for all variability) rather than a single clock in the statistical static timing analysis (SSTA) process, because the clock may be added as another source of variabilities (clock sensitivity). The typical clock assertion or constraint is defined by a clock period and a waveform (leading and trailing edges of the clock). The values provided for the clock are singular deterministic values. However, a canonical clock assertion may be created such that the period and waveform are sensitive to sources of variability. The canonical clock, when asserted, will propagate in SSTA and indicate how the clock period changes across those sources of variation. Because voltage variability is one of the variabilities that is considered, the variation of the clock period $T_C$ according to variation in voltage may be modeled (without individually computing each clock period value for each voltage value).

Based on EQ. 7, the voltage value may be fixed to a desired value (e.g., to achieve low power consumption) and $T_C$ (thus, frequency) may be determined according to the process variability. According to an alternate embodiment, $T_C$ (frequency) may be fixed to a desired value (e.g., to achieve a certain performance) and voltage may be determined according to the process variability. While the two embodiments described above pertain to dynamic voltage frequency scaling during chip operation, based on the canonical expression of the clock period (EQ. 7), chip design may be affected using the canonical expression of clock period, as well. According to this alternate embodiment, both voltage and frequency (clock period) may be set and provided as inputs to timing analysis. This embodiment is discussed with reference to FIG. 4 below. Obtaining the canonical form of EQ. 4 (i.e., EQ. 7) during the design is a fundamental part of facilitating any of the above-noted three exemplary embodiments for obtaining the desired frequency and voltage. Then, regardless of the specific embodiment by which the canonical expression is used, performance, related to frequency ($T_C$), and power consumption, related to considering voltage variability, may be balanced (i.e., dynamic voltage frequency scaling may be achieved), without the inefficiency of multi-corner computations.

Figure 4:
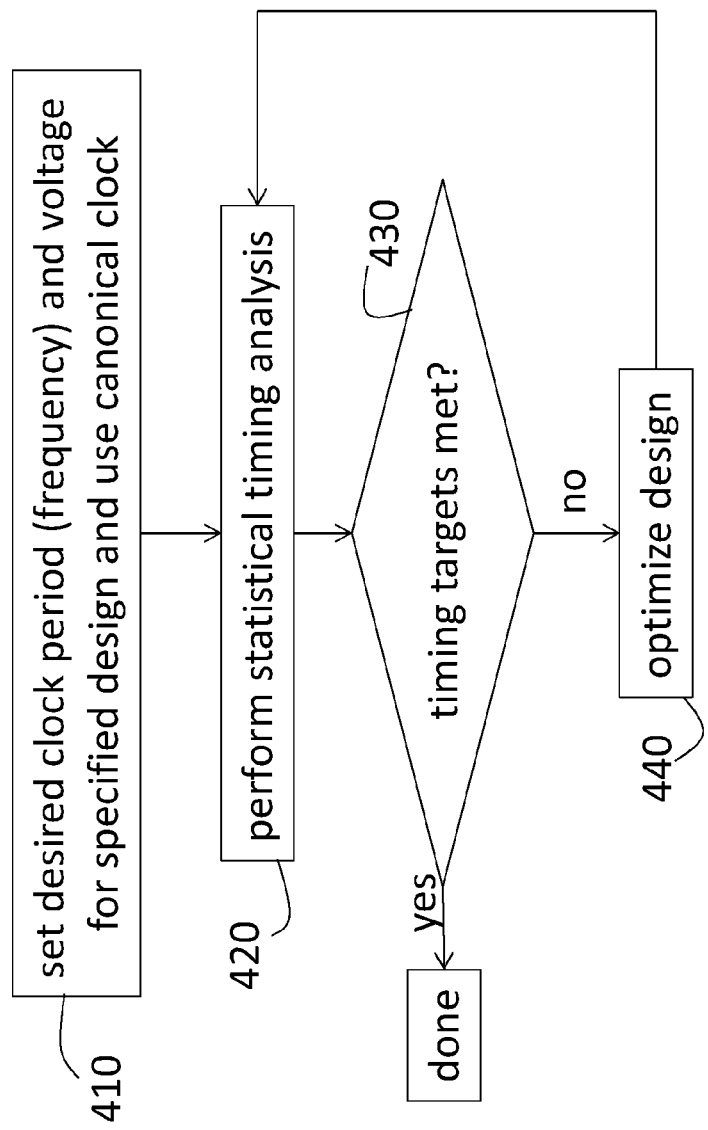
FIG. 4 is a process flow of a method of adjusting the design based on asserting a canonical clock according to embodiments.

FIG. 4 is a process flow of a method of adjusting the design based on asserting a canonical clock according to embodiments. At block 410, setting desired clock period $T_C$ (frequency) and voltage for a specified design and using a canonical clock means that voltage and $T_C$ values are selected and provided as input rather than determining one based on the other according to the above-described alternate embodiments, for example. Based on the specified design, performing statistical timing analysis, at block 420, is a known process of obtaining arrival times at and delays through components of the chip design for the specified voltage and $T_C$. As discussed above, a canonical clock that is expressed as a function of voltage variability is used in the timing analysis. In this way, the canonical slack (obtained according to EQ. 2 for a setup test, for example) includes a consideration of the dependence of the clock on voltage. Checking the obtained timing values against design constraints to determine whether timing requirements are met is performed at block 430. If timing targets are met, then the selected voltage and clock period already conform to design requirements. If the timing targets are not met for the selected voltage and clock period, then optimizing the design by known techniques is performed at block 440. The process at block 440 includes modifying the netlist (connectivities in the design) across the process-voltage-temperature (PVT) space (i.e., for all corners). The optimized design (with the selected voltage and clock period) is tested again (block 420) and the processes (block 420 through block 440) are repeated as needed. As a result of the processes, a design is obtained (process variations are modified) that supports the selected voltage and clock period combination. As noted above, this is one application of determining the parameters in EQ. 4 as functions of variability (i.e., in canonical form). As also noted above, other applications include determining clock period (frequency) based on a selected voltage variation or determining voltage based on a selected clock period.

Figure 5:
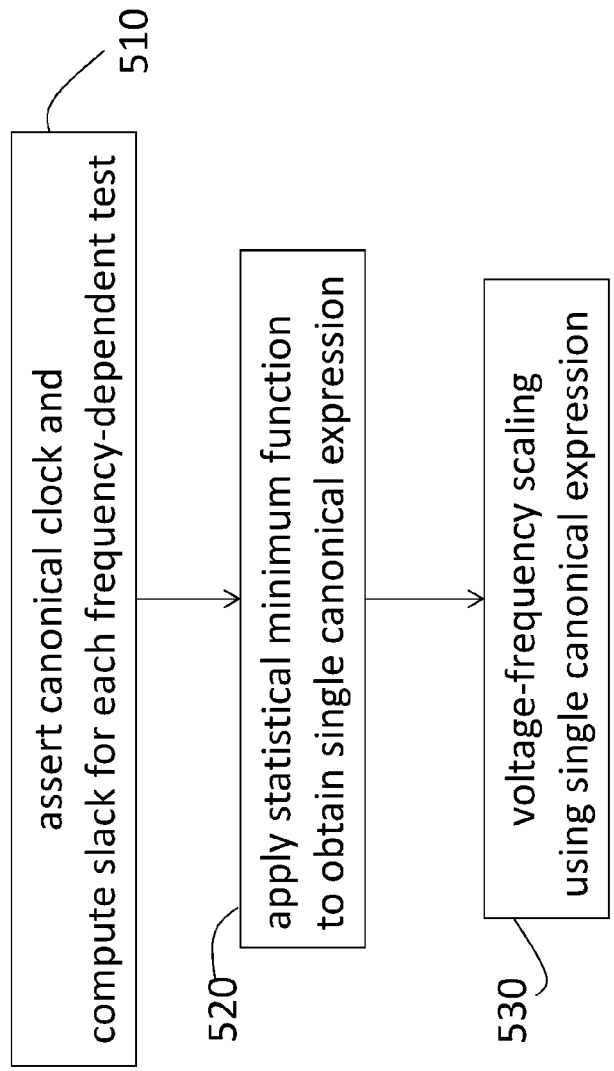
FIG. 5 is a process flow of a method of performing dynamic voltage frequency scaling according to embodiments.

FIG. 5 is a process flow of a method of performing dynamic voltage frequency scaling according to embodiments. At block 510, asserting a canonical clock and computing slack for each frequency-dependent test includes computing minimum slack (e.g., slack S=0) to obtain EQ. 4 at each latch in the chip design for the setup test, for example. Each latch must be separately analyzed because the mean and variabilities of one or more terms of EQ. 4 may (and likely will) differ at each latch. Applying a statistical minimum function to obtain a single canonical expression, at block 520, provides the worst-case canonical expression. That is, when a frequency is selected such that the corresponding period exceeds the $T_C$ obtained with the statistical minimum function for a given process variability and voltage variability, that frequency will satisfy timing requirements for the entire chip. This single canonical expression facilitates the dynamic voltage-frequency scaling as described above. That is, a voltage value (specific voltage variability) may be selected in consideration of power consumption. The corresponding frequency (in the form of clock period $T_C$) is obtained from the canonical expression based on process variability. Alternately, a frequency may be selected in consideration of performance. The corresponding voltage (voltage variability) is obtained from the canonical expression based on process variability. Because the determination of the canonical expression is performed during the design stage, both frequency and voltage may be selected according to yet another alternative. In this case, process variability may be controlled through design changes as described with reference to FIG. 4. At block 530, performing voltage-frequency scaling using the single canonical expression obtained at block 520 includes using an input (e.g., frequency selection or voltage selection) or linear combination of inputs.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of performing dynamic voltage-frequency scaling of an integrated circuit, the method comprising:
    performing statistical timing analysis using a canonical form of a clock, the canonical form of the clock being a function of variability in voltage;
    obtaining, using a processor, a canonical model expressing timing slack at each test location of the integrated circuit as a function of one or more sources of variability, one of the one or more sources of variability being voltage;
    determining, using the canonical model, a clock period value or a voltage value based, respectively, on selecting a desired voltage or a desired clock period; and
    controlling a physical implementation of the integrated circuit according to the clock period value and the desired voltage or the voltage value and the desired clock period to perform the dynamic voltage-frequency scaling.

2. The computer-implemented method according to claim 1, wherein the obtaining the canonical model expressing the timing slack at each test location includes performing a frequency-based timing analysis test at each test location.

3. The computer-implemented method according to claim 1, wherein performing the dynamic voltage-frequency scaling using the canonical model expressing the timing slack results in a voltage-frequency pair that meets timing constraints for the integrated circuit.

4. The computer-implemented method according to claim 1, wherein the performing the statistical timing analysis includes performing a setup test at each latch and obtaining the canonical model expressing timing slack includes solving for a minimum timing slack of 0 to obtain:

$T_C = AT(D) - AT(C) + T_G$, where $T_C$ is the clock period, AT(D) is an arrival time at a data input of the latch, AT(C)) is an arrival time at a clock input of the latch, and $T_G$ is a guard time.

5. The computer-implemented method according to claim 4, wherein the obtaining the canonical model expressing timing slack includes obtaining a canonical expression of the clock period for the minimum timing slack of 0 as:

$$T_C = t_0 + \sum_{i=1}^{n} a_i \Delta X_i + r\Delta R,$$

where
    $t_0$ is a mean, $a_i \Delta X_i$ represents each of n variabilities including the voltage variability, and $r\Delta R$ represents random variability.

6. The computer-implemented method according to claim 1, wherein performing the dynamic voltage frequency scaling includes selecting the desired clock period and controlling the voltage value based on others of the one or more sources of variability, the others of the one or more sources of variability including process variability.

7. The computer-implemented method according to claim 1, wherein performing the dynamic voltage frequency scaling includes selecting the desired voltage and controlling the clock period value based on others of the sources of variability, the others of the one or more sources of variability including process variability.

8. The computer-implemented method according to claim 1, further comprising selecting the voltage and the clock period and modifying a design of the integrated circuit to meet timing requirements.

9. A system to perform dynamic voltage frequency scaling of an integrated circuit, the system comprising:
    a memory device configured to store a design of the integrated circuit; and
    a processor configured to perform statistical analysis on the design using a canonical form of a clock, the canonical form of the clock being a function of variability in voltage, obtain a canonical model expressing timing slack at each test location of the integrated circuit as a function of one or more sources of variability, one of the one or more sources of variability being voltage, make a determination, using the canonical model, of a clock period value or a voltage value based, respectively, on selecting a desired voltage or a desired clock period; and control a physical implementation of the integrated circuit according to the clock period value and the desired voltage or the voltage value and the desired clock period to perform the dynamic voltage-frequency scaling.

10. The system according to claim 9, wherein the processor obtains the canonical model expressing the timing slack at each test location based on performing a frequency-based timing analysis test at each test location.

11. The system according to claim 10, wherein the processor performs the dynamic voltage-frequency scaling to obtain a voltage-frequency pair that meets timing constraints for the integrated circuit.

12. The system according to claim 11, wherein the processor performs a setup timing analysis test at each latch and obtains the canonical model expressing timing slack by solving for a minimum timing slack of 0 to obtain:

$T_C = AT(D) - AT(C) + T_G$, where $T_C$ is the clock period, AT(D) is an arrival time at a data input of the latch, AT(C)) is an arrival time at a clock input of the latch, and $T_G$ is a guard time, and the processor obtains a canonical expression of the clock period for the minimum slack of 0 as:

$$T_C = t_0 + \sum_{i=1}^{n} a_i \Delta X_i + r\Delta R,$$

where $t_0$ is a mean, $a_i \Delta X_i$ represents each of n variabilities including the voltage variability, and $r\Delta R$ represents random variability.

13. The system according to claim 9, wherein the processor performs the dynamic voltage frequency scaling based on selecting the desired clock period and controlling the voltage value based on others of the one or more sources of variability, the others of the one or more sources of variability including process variability.

14. The system according to claim 9, wherein the processor performs the dynamic voltage frequency scaling based on selecting the desired voltage and controlling the clock period value based on others of the one or more sources of variability, the others of the one or more sources of variability including process variability.

15. The system according to claim 9, wherein the processor selects the voltage and the clock period and modifies the design of the integrated circuit to meet timing requirements.

16. A computer program product for performing dynamic voltage frequency scaling of an integrated circuit, the computer program product comprising a computer readable storage medium having program instructions embodied therewith, the program instructions executable by a processor to perform a method comprising:
    performing statistical timing analysis using a canonical form of a clock, the canonical form of the clock being a function of variability in voltage;
    obtaining a canonical model expressing timing slack at each test location of the integrated circuit as a function of one or more sources of variability, one of the one or more sources of variability being voltage; and
    determining, using the canonical model, a clock period value or a voltage value based, respectively, on selecting a desired voltage or a desired clock period, wherein controlling a physical implementation of the integrated circuit is based on the clock period value and the desired voltage or the voltage value and the desired clock period to perform the dynamic voltage-frequency scaling.

17. The computer program product according to claim 16, wherein the obtaining the canonical model expressing the timing slack at each test location includes performing a frequency-based timing analysis test at each test location, and performing the dynamic voltage-frequency scaling using the canonical model expressing the timing slack results in a voltage-frequency pair that meets timing constraints for the integrated circuit.

18. The computer program product according to claim 16, wherein the performing dynamic voltage frequency scaling includes selecting the desired clock period and the determining the voltage value is based on others of the one or more sources of variability, the others of the one or more sources of variability including process variability.

19. The computer program product according to claim 16, wherein performing the dynamic voltage frequency scaling includes selecting the desired voltage and the determining the clock period value is based on others of the one or more sources of variability, the others of the one or more sources of variability including process variability.

20. The computer program product according to claim 16, further comprising selecting the voltage and the clock period and modifying a design of the integrated circuit to meet timing requirements.

\* \* \* \* \*